March 31, 1970   H. D. KRUMMELL ET AL   3,503,524

CANTILEVER RACK

Filed June 28, 1967

INVENTORS
HARRY D. KRUMMELL, DECEASED
By MILDRED A. KRUMMELL, EXECUTRIX
JOHN D. KRUMMELL

BY *Lyon+Lyon*

ATTORNEYS

United States Patent Office 3,503,524
Patented Mar. 31, 1970

3,503,524
CANTILEVER RACK
Harry D. Krummell, deceased, late of 14663 La Cuarta St., Whittier, Calif. 90605, by Mildred A. Krummell, executrix, Whittier, Calif., and John D. Krummell, 1625 W. El Segundo Blvd., Whittier, Calif. 90222
Filed June 28, 1967, Ser. No. 649,747
Int. Cl. A47b 96/12
U.S. Cl. 211—176                                9 Claims

ABSTRACT OF THE DISCLOSURE

A cantilever rack having a channel shaped mounting fixture provided with a pair of angularly disposed apertures having curved bearing surfaces, and a mounting post provided with similarly disposed pairs of perforations also having curved bearing surfaces; corresponding apertures of the fixture and post being dimensioned to receive a cross bar having opposed sets of curved bearing surfaces, the radius of the bearing surfaces formed on the bar being slightly less than the radius of the mating bearing surfaces of said fixture and post to provide essentially line loading under nominal loading force and area loading under greater loading force without causing permanent deformation of the bearing surfaces formed by the walls of the apertures.

BACKGROUND OF THE INVENTION

This invention is directed to cantilever racks; that is to racks having vertical posts and channel shaped mounting fixtures carrying cantilever supporting beams connected by cross bars extending through the post and the mounting fixture. The prior art is exemplified by the Baker et al. patent issued Oct. 19, 1965, Patent No. 3,212,648.

This patent illustrates a rectangular cross bar, a side of which is intended to bear against sides of corresponding apertures in the mounting post and the mounting fixture. In order to provide a distributed load, the engaging surfaces must share a common plane; that is, these surfaces cannot be angularly related. Under ordinary manufacturing tolerances this is difficult to attain with the result that often only line contact is developed between a corner of the bar and the aperture wall, creating a detrimental stress concentration which weakens the connection.

In the present invention the confronting bearing surfaces of the cross bar and the apertures in the mounting post and mounting fixture are arcuate. The radius of curvature is quite large, in the range of several inches The radius curvature of the bearing surfaces on the cross bar is slightly less than the radius of the confronting aperture wall. Thus, under nominal loads, only line contact is attained; however, under heavy loads area contact may be achieved by slight deformation of the aperture wall. The radius of the aperture wall being only slightly greater than the cross bar, the deformation is within elastic limits of the metal forming the mounting fixture.

Still further, the curved surfaces permit relative displacement within the range of ordinary manufacturing tolerances, without developing stress concentrations and weakening the connection between the post and the cantilever brackets.

SPECIFICATION

Figure 1:
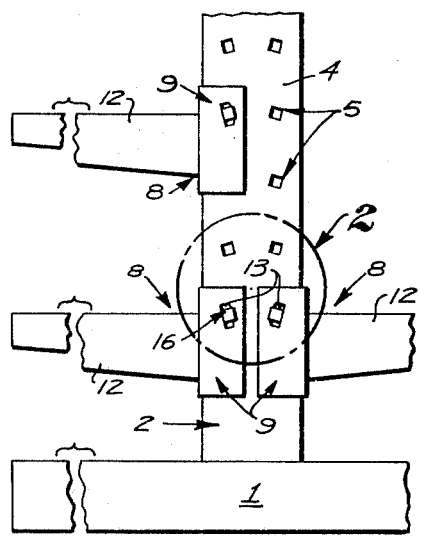
FIGURE 1 is a fragmentary end view of the cantilever rack.

The cantilever rack includes a base member 1, to which is secured a vertical post 2. The post is in the form of a hollow, rectangular tube and may be formed as a single piece, or formed from a pair of channel members, positioned with their flanges in abutting or spaced relation. Two opposed walls of the post form abutment walls 3, and the remaining two walls are designated side walls 4. If desired, the post may be tapered.

The side walls 4 are provided with vertical columns of spaced perforations 5, aligned parallel to abutment walls 3, and arranged in horizontally aligned pairs. Each perforation is essentially square except that the laterally outer wall 6 is arcuate, whereas the remaining walls 7 are straight or curved. The perforations are canted so that the axis between the curved wall 6 and its opposite wall defines with the corresponding abutment wall 3, an acute upwardly converging angle A, indicated in FIGURE 2.

The post 2 is intended to support a plurality of cantilever brackets 8. Each cantilever bracket includes a channel shaped mounting fixture 9, including a web 10 and flanges 11. The web 10 extends across the abutment wall 3 of the post, and the flanges 11 overlap the side walls 4. A cantilever beam 12 is welded to or otherwise secured to the fixture 9 and extends horizontally therefrom, or may slope upwardly a few degrees.

The flanges 11 of each fixture 9 are provided with a pair of apertures 13. Each aperture is provided with an arcuate bearing wall 14, at its side most remote from the web 10, and upper and lower end walls 15. The end walls 15 are spaced a greater distance than the distance between the upper and lower walls 7 of the perforations 5. The axis between the curved wall 14 and its opposite wall is canted to correspond with the axis between the curved wall 6 and its opposite wall so as to define the wedge angle A.

Each pair of perforations 5 and apertures 13 is adapted to receive a cross bar 16, which is essentially square in cross section. Formed on opposite sides of the cross bar are pairs of arcuate bearing surfaces 17 and 18. The dimensions of the bar are such that the bar forms a sliding fit through the perforations 5 of the post 2. The arcuate side 6 of each perforation 5 bears against a surface 17; whereas, the arcuate side 14 of each aperture 13 bears against the arcuate surface 18 of the cross bar.

Figure 2:
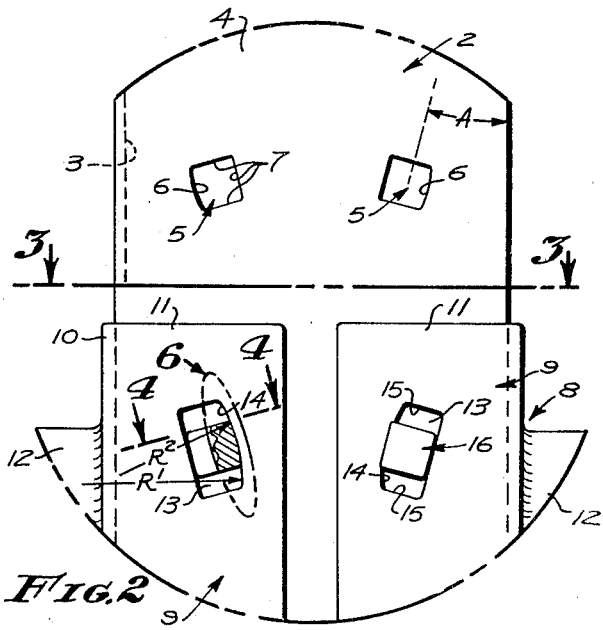
FIGURE 2 is an enlarged fragmentary end view taken within circle 2 of FIGURE 1.
Figure 6:
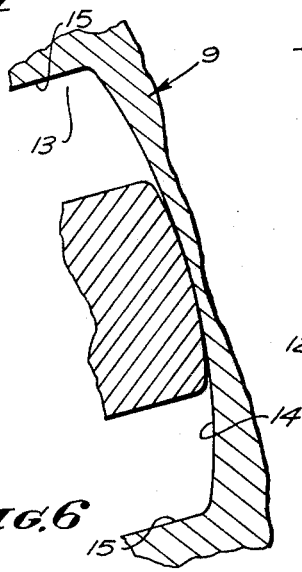
FIGURE 6 is a greatly enlarged fragmentary sectional view, taken within circle 6 of FIGURE 2, illustrating particularly the confronting arcuate bearing surfaces of the cross bar and a corresponding aperture wall.
Figure 3:
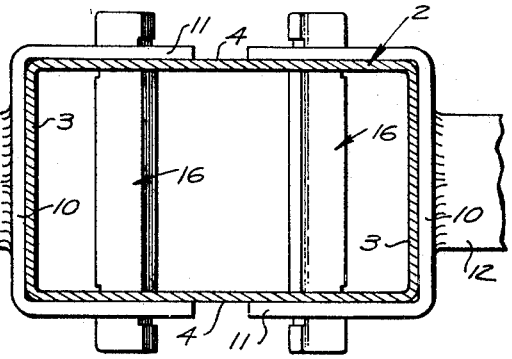
FIGURE 3 is an enlarged fragmentary transverse sectional view taken through 3—3 of FIGURE 2.
Figure 5:
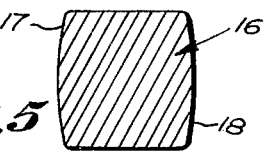
FIGURE 5 is a transverse sectional view of the bar taken through 5—5 of FIGURE 4.
Figure 4:
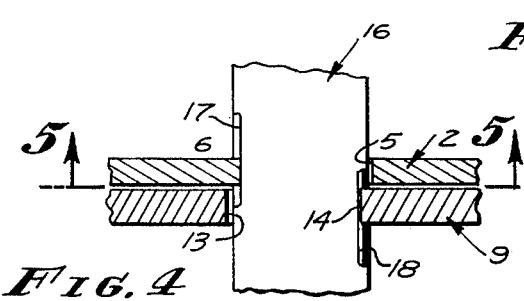
FIGURE 4 is a further enlarged fragmentary sectional view taken through 4—4 of FIGURE 2.

The radius of each arcuate wall 14, designated R1, is greater than the radius of the arcuate side 18, designated R2, as indicated in FIGURE 2. Furthermore, each radius is in excess of twice the width of the aperture 13, or the cross bar 16, and subtends a relatively small arc. Furthermore, the difference in radius is such that, when the center of the arcuate side 18 is in line contact with the arcuate wall 14, the extremities of the arcuate side 17 need to clear the arcuate wall 14 only a few thousandths of an inch. The amount of clearance varies, depending upon the materials used to make the mounting fixture 9, post 2, and cross bar 16.

However, it is not intended that under the designed load the entire width of the arcuate side 18 will be in contact with the arcuate wall 14, so that some relative angular displacement between the arcuate wall 14 and the arcuate side 18 may occur without a corner of the bar pressing into the wall 14 and creating a stress concentration. Still further, should the design loads be exceeded and some permanent deformation occur, the deformation is attenuated toward the ends of the area of contact and thus minimizes stress concentration; that is, the unit pressure between the bar 16 and the wall 14 diminishes toward the extremities of the area of contact.

It should be noted that while an arc of constant radius is indicated, the radius may decrease towards the extremities of the arcuate sides 18.

The space between the end walls 15 is substantially greater than the thickness of the bar so that when weight is placed on the bracket, the web 10 wedges tightly against the abutment wall 3.

With regard to the arcuate side 6 of a perforation 5, and the corresponding bearing surface 17 of the bar 16, the same relationship may exist as that between the arcuate wall 14 and the surface 17.

It should be noted that the functions of the perforation 5 and aperture 13 may be reversed; that is, the perforation 5 may be elongated and the aperture 13 made more nearly square.

While particular embodiments of this invention have been shown and described, it is not intended to limit the same to the details of the constructions set forth.

We claim:

1. A rack, comprising:
  (a) a post having a front wall and essentially parallel side walls extending from said front wall, said side walls having pairs of aligned perforations;
  (b) a bracket including a channel member having a web fitting over said front wall and side flanges fitting over said side walls;
  (c) said side flanges having apertures in registry with selected pairs of perforations in said post, at least one wall of each aperture being arcuate and having a radius of curvature which exceeds the maximum width of the aperture;
  (d) and a mounting bar fitting the perforations in said post and having ends extending through the apertures in said channel member, said mounting bar having arcuate bearing surfaces fitting said apertures, the radius of which exceeds the thickness of the bar, but is less than the radius of the curved wall of said apertures, the difference in radius being such that the region of contact may progress from line contact to area contact under load, and the contact force diminishes toward the extremities of the region of contact.

2. A rack, as defined in claim 1, wherein:
  (a) the radius of curvature of the curved wall of each aperture exceeds two times the maximum width of said aperture;
  (b) and the radius of curvature of the arcuate side of said bar exceeds two times the maximum transverse dimension of said bar.

3. A rack, as defined in claim 1, wherein:
  (a) the arcuate bearing surfaces in said bar are recessed below a side surface of the bar, said side surface otherwise being planar.

4. A rack, as defined in claim 1, wherein:
  (a) each pair of perforations in said posts have arcuate sides of similar radius, similar to the arcuate sides of said apertures, the arcuate sides of said perforations being located at the opposite side of said bar from the arcuate sides of the apertures in said bracket;
  (b) and said bar has two sets of oppositely directed arcuate bearing surfaces.

5. A rack, as defined in claim 1, wherein:
  (a) the curved wall of each aperture converges toward the web of said channel member to form therewith a curved wedge face having wedging contact with said bar in response to downward force on said channel member.

6. A rack, comprising:
  (a) a post having a front wall and essentially parallel side walls extending from said front wall, said side walls having pairs of aligned perforations;
  (b) a bracket including a channel member having a web fitting over said front wall and side flanges fitting over said side walls;
  (c) said side flanges having apertures in registry with selected pairs of perforations in said post, at least one wall being arcuate, and having an average slope converging upwardly in wedging relation to the front wall of said post;
  (d) and a mounting bar nonrotatably fitting the perforations in said post and having ends extending through the apertures in said channel member, said mounting bar having arcuate bearing surfaces confronting the arcuate walls of said apertures, the curvature of the bearing surfaces of said bar being less than the curvature of the arcuate walls of said apertures, whereby said bar is capable of limited arcuate displacement without necessarily requiring bearing engagement of the extreme margins of said bearing surfaces with said wall.

7. A rack, comprising:
  (a) a post having a front bearing wall and essentially parallel side walls extending from said front wall, said side walls having columns of horizontally aligned pairs of perforations, said perforations being tilted with respect to said front wall to define an upwardly directed acute angle;
  (b) a bracket including a channel member having a web fitting over said front wall and side flanges fitting over said side walls;
  (c) the side flanges of said bracket having apertures adapted to be placed in registry with any of said pairs of perforations, said apertures being tilted similarly to said perforations;
  (d) said perforations having arcuate bearing walls at their tilted sides remote from said front wall; said apertures having arcuate bearing walls at their tilted sides adjacent said web;
  (e) and a mounting bar having opposed arcuate bearing surfaces engaging the arcuate bearing walls of said perforations and said apertures.

8. A rack, as defined in claim 7, wherein:
  (a) said apertures being of greater length along their tilted axes than said perforations, whereby on downward movement of said bracket, the web of said bracket is wedged against the front wall of said post, and the bearing wall of said bracket is wedged against said bar.

9. A rack, as defined in claim 7, wherein:
  (a) the radius of curvature of the arcuate bearing walls of at least said bracket is greater than the radius of curvature of the mating arcuate bearing surface of said bar and the radius of curvature of the bearing surface of said bar exceeds twice the width of said bar.

References Cited

UNITED STATES PATENTS

| | | | |
|---|---|---|---|
| 656,456 | 8/1900 | Hirsch | 248—224 |
| 1,626,121 | 4/1927 | Silber | 5—294 |
| 3,212,648 | 10/1965 | Baker et al. | 211—177 |
| 3,351,212 | 11/1967 | McConnell | 211—177 |

ROY D. FRAZIER, Primary Examiner

A. FRANKEL, Assistant Examiner

U.S. Cl. X.R.

108—108; 211—177; 248—245